(12) United States Patent
Russ et al.

(10) Patent No.: US 10,781,602 B1
(45) Date of Patent: Sep. 22, 2020

(54) HELICAL ANCHOR FOUNDATION SYSTEM

(71) Applicants: Kevin J. Russ, Southbury, CT (US); Joshua A. Dotson, Sylvania, OH (US); Lucas B. Turner, Montclair, CA (US)

(72) Inventors: Kevin J. Russ, Southbury, CT (US); Joshua A. Dotson, Sylvania, OH (US); Lucas B. Turner, Montclair, CA (US)

(*) Notice: Subject to any disclaimer, the term of this patent is extended or adjusted under 35 U.S.C. 154(b) by 0 days.

(21) Appl. No.: 16/806,268

(22) Filed: Mar. 2, 2020

(51) Int. Cl.
*E04H 12/22* (2006.01)
*E02D 37/00* (2006.01)
*F21S 8/08* (2006.01)

(52) U.S. Cl.
CPC ........ *E04H 12/2253* (2013.01); *E02D 37/00* (2013.01); *F21S 8/086* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,647,593 A * | 8/1953 | Holman | ............ | E04H 12/2215 52/114 |
| 4,981,404 A * | 1/1991 | Chamberlain | ........ | F16B 31/025 116/DIG. 34 |
| 6,655,648 B2 * | 12/2003 | Harris | ............... | E02D 27/14 220/475 |
| 7,721,490 B1 * | 5/2010 | Cerula | ............... | E04H 12/2253 52/169.9 |
| 8,677,700 B2 * | 3/2014 | Fairbairn | ............... | E02D 27/42 248/523 |
| 8,985,907 B2 * | 3/2015 | Okobi | ............... | E04H 12/2223 405/184.4 |
| 10,077,893 B1 * | 9/2018 | Abraham | ............ | F21V 33/0052 |
| 2004/0070985 A1 * | 4/2004 | Haddad | ............... | F21S 8/088 362/431 |
| 2010/0257794 A1 * | 10/2010 | Stark | ............... | E04H 12/2215 52/158 |
| 2015/0267904 A1 * | 9/2015 | Magargee | ............ | E04H 12/2269 362/431 |

* cited by examiner

*Primary Examiner* — Kyle Armstrong
(74) *Attorney, Agent, or Firm* — RC Trademark Company

(57) ABSTRACT

According to some embodiments, a light pole replacement system is disclosed. The light pole replacement system comprises a foundation plate to support a replacement light pole, a plurality of anchor tubes, threaded rods, and tension bolt adapters. The plurality of anchor tubes is placed into the ground based on a determined placement of the plurality of anchor tubes. Holes are created in the foundation plate based on a location of the plurality of anchor tubes and the foundation plate is placed over the plurality of anchor tubes with the threaded rods and the tension bolt adapters in the plurality of anchor tubes to couple the foundation plate to the plurality of anchor tubes.

20 Claims, 5 Drawing Sheets

HELICAL ANCHOR FOUNDATION SYSTEM

BACKGROUND

The latest generation of mobile broadband networks (i.e., 5G) can function through small cells that are integrated into light poles along city streets. These light poles provide light to the city streets and also function as access points to a mobile broadband network. However, conventional methods to replace an existing light pole require an existing foundation to be removed in order to install a new light pole that is cellular integrated. Removing an existing foundation may take several weeks to accomplish due to concrete foundations needing to be dug up, new forms put in place and time for new concrete to cure. Alternatively, a new foundation may be dug in a new location. However, installing a light pole in a new location can esthetically ruin the look of evenly spaced poles along a street. Therefore, it would be desirable to implement a light pole replacement system that is faster than conventional methods and allows for the spacing of existing light poles to remain esthetically correct.

SUMMARY

Some embodiments described herein relate to a light pole replacement system. The light pole replacement system comprises a foundation plate to support a replacement light pole, a plurality of anchor tubes, threaded rods, and tension bolt adapters. The plurality of anchor tubes is placed into the ground based on a determined placement of the plurality of anchor tubes. Holes are created in the foundation plate based on a location of the plurality of anchor tubes and the foundation plate is placed over the plurality of anchor tubes with the threaded rods and the tension bolt adapters in the plurality of anchor tubes to couple the foundation plate to the plurality of anchor tubes

DETAILED DESCRIPTION

In the following detailed description, numerous specific details are set forth in order to provide a thorough understanding of the embodiments. However, it will be understood by those of ordinary skill in the art that the embodiments may be practiced without these specific details. In other instances, well-known methods, procedures, and components have not been described in detail so as not to obscure the embodiments.

The present embodiments described herein relate to a light pole replacement system. In particular, the present embodiments relate to a light pole replacement system that allows for faster installation of a replacement light pole than conventional methods with the replacement light pole remaining in a same position as a previous light pole. In some instances, the replacement light pole may be installed in a single day because it may go over the area of an existing foundation, or footing, and may include the flexibility to work around locations of existing buried utilities. In some embodiments, the replacement light pole may comprise a cellular integrated light pole (e.g., a light pole that include a cellular communication antennae or antennas). Building codes associated light poles are different than building codes associated with cellular integrated light poles and when a light pole is cellular integrated, its primary function is considered to be that of a cellular pole and thus the it is installed based on a different building code.

Figure 1:
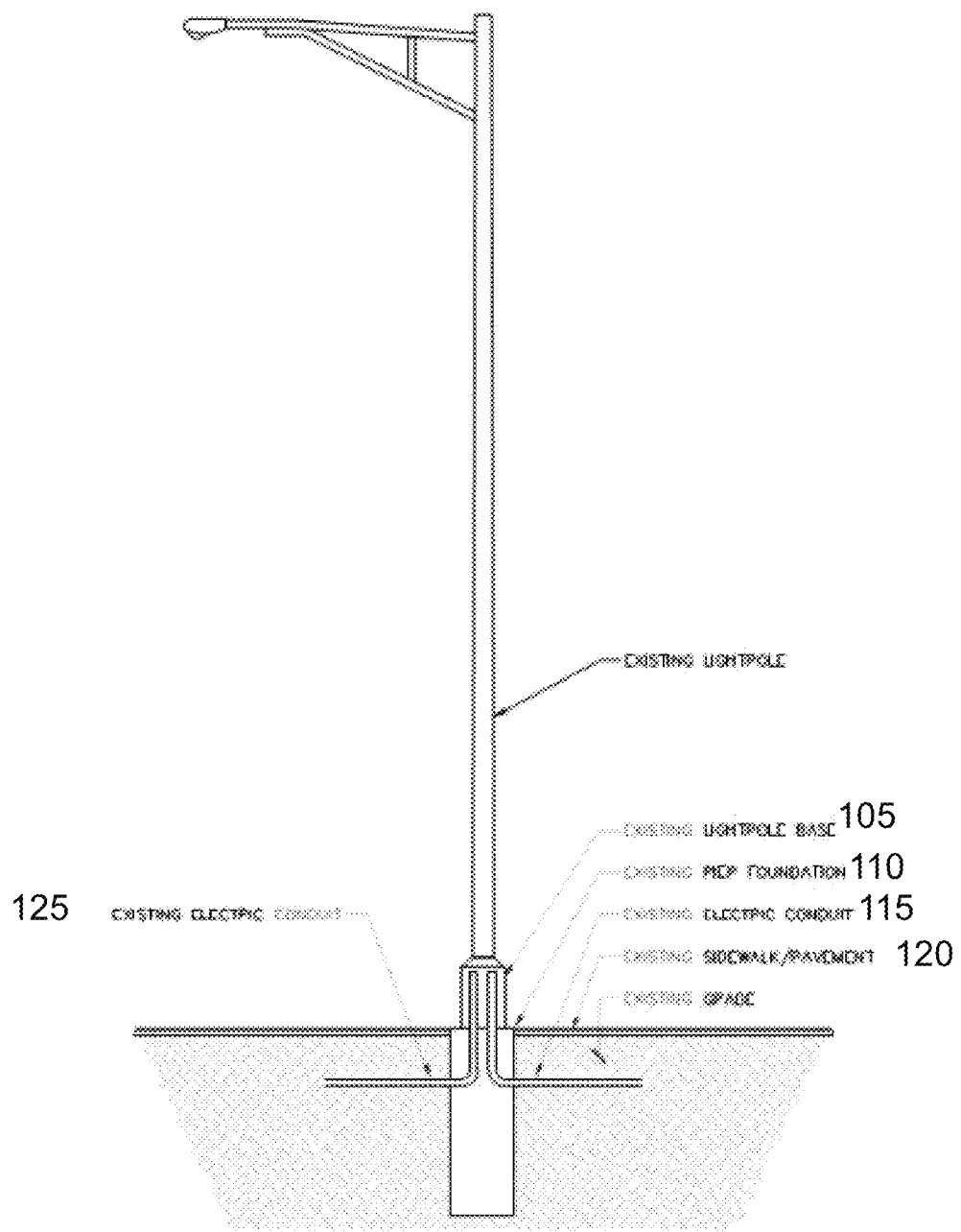
FIG. 1 illustrates a conventional light pole.

Referring now to FIG. 1, a conventional light pole 100 is illustrated. The conventional light pole 100 includes a base 105 that is mounted to a concrete foundation 110 and the conventional light pole 100 may reside on, or next to, a sidewalk or pavement 120. Electrical conduit 115/125 may be run through the foundation 110, next to the foundation 110, or in an area surrounding the foundation 110 to provide electrical or other services to the light pole 100.

Figure 2:
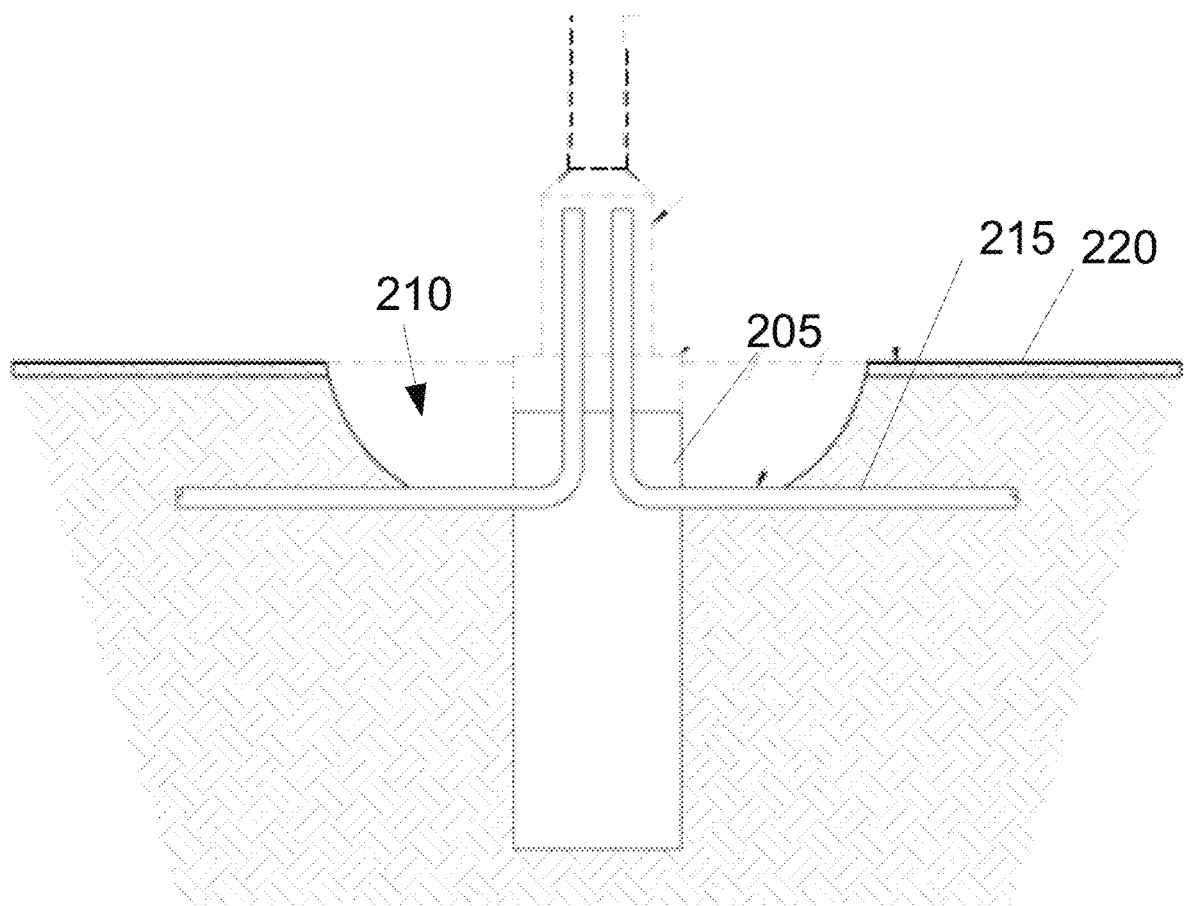
FIG. 2 illustrates an excavation associated with a light pole replacement system in accordance with some embodiments.

Referring now to FIG. 2, to install a replacement light pole, a user may excavate 1'-6' of earth to create an excavated area 210 around an existing light pole to facilitate the breaking out of an existing foundation 205. The existing foundation may be broken out anywhere from 6 inches to 3 feet below a finished grade 220 where the existing electrical conduit 215 may be kept in place. In some embodiments, the electrical conduit 215 may house wires carrying electronically and/or communication wires for carrying communication signals.

Figure 3:
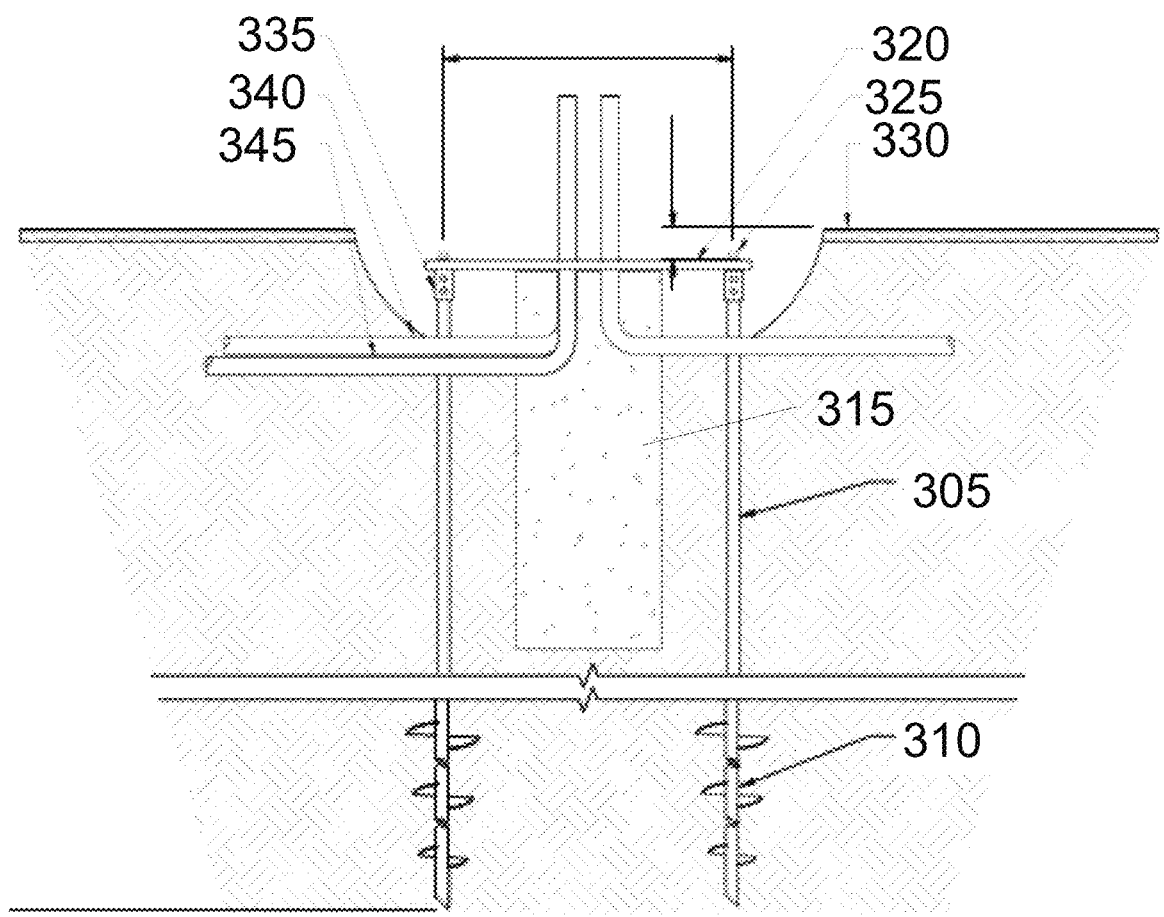
FIG. 3 illustrates a light pole replacement system in accordance with some embodiments.

Referring now to FIG. 3, a light pole replacement system 300 is illustrated according to some embodiments. As illustrated in FIG. 3, a foundation 315 has been broken out to below ground level 330 with electrical conduits 345 still intact. A user may locate placement of anchors 310 to be installed around existing utilities such as electrical conduits and/or water lines. Anchors 310, and their associated anchor tubes 305, may be installed into the ground (e.g. driven into the ground or installed using other methods of installing anchors). The user may monitor torque and depth of the anchors 310 and their associated anchor tubes 305. In some embodiments, the anchors 310 may include helical anchors 310 and the tubes 305 associated with the helical anchors that may be cut to length as determined by the user. A helical anchor may include an extendable deep foundation system with helical bearing plates coupled (e.g., welded or fastened) to a tube or shaft for transferring a load from the tube to the surrounding earth through the use of the bearing plates. In some embodiments, the tubes 305 may be cut to a determined length based on a finished grade associated with the existing light pole. The anchors 310 and their associated tubes 305 may installed between 2 and 20 feet below a finished grade associated with the existing light pole.

Figure 5:
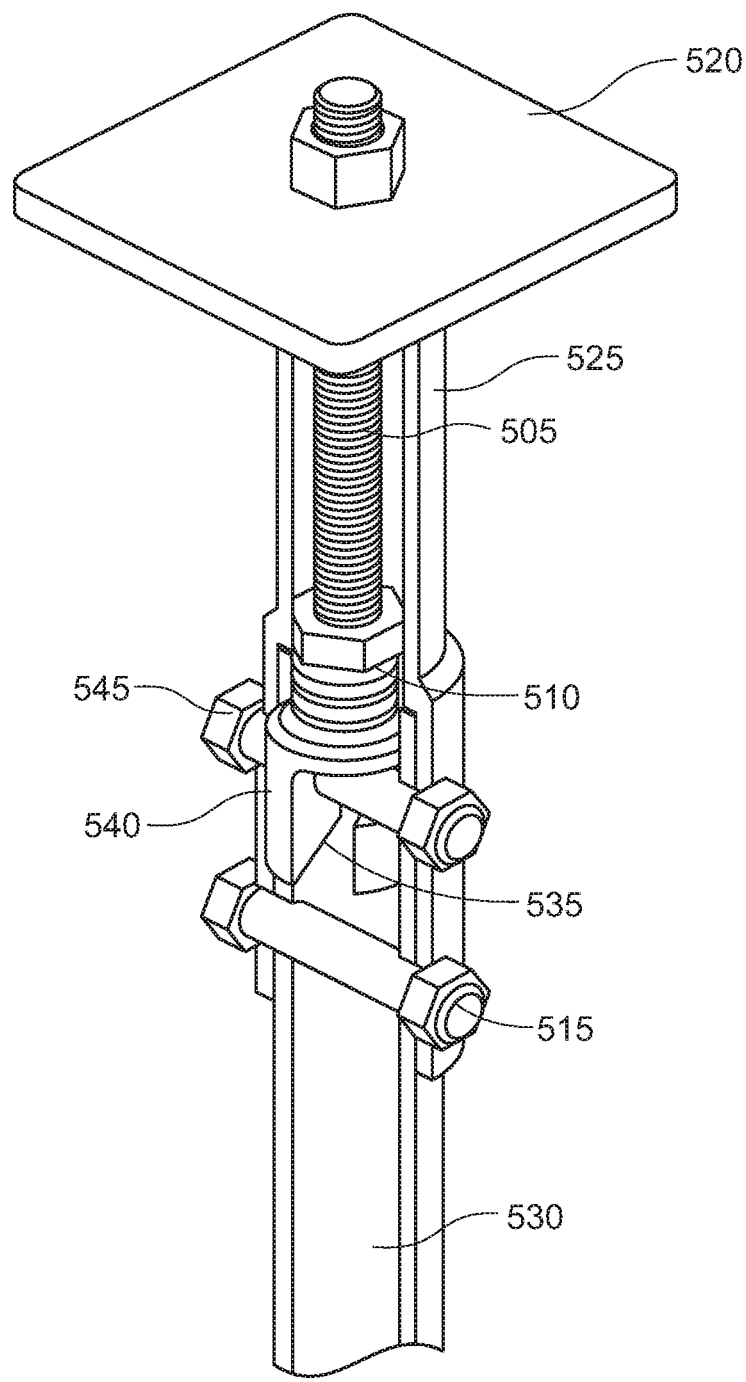
FIG. 5 illustrates a portion of a light pole replacement system attached in accordance with some embodiments.

A tension bolt adapter 335 may be inserted into each respective tube 305. Referring to FIG. 5, a tension bolt adapter 540 inserted into a tube 530 is illustrated according to some embodiments. The tension bolt adapter 540 may include a top portion 510 to receive a threaded rod 505, and an opening 535 to receive one or more fasteners 545 (e.g., bolts). The top portion 510 may include a threaded pocket or opening to receive the threaded rod. The opening 535 to receive one or more fasteners 545 may receive the one or more fasteners when they extend perpendicular to a length of the tube. The one or more fasteners 545 may secure the tension bolt adapter 540 to the tube 530. In some embodiments, a protective covering 525 may be placed over the threaded rod to keep moisture and dirt from entering the tube 530. The covering 525 may be secured to the tube 530 via a fastener 515 (e.g., a bolt). The threaded rod 505, after being inserted into the tension bolt adapter 540, may be cut to length as determined by a user. The threaded rod 505 may be inserted through, and secured to, a foundation plate 520 to support a replacement light pole and the threaded rod 505 may be secured to the foundation plate 520 by a nut or other fastener. In some embodiments, the foundation plate may rest on the protective covering 325. Thus, when the tubes are cut to a same height, the foundation plate is leveled by sitting on top of the protective covering 325 or tubes.

Referring back to FIG. 3, anchor tube 305 locations may be transferred to a foundation plate 320 and the foundation plate 320 and holes may be created in the foundation plate. For example, the holes may be field drilled, knocked out, or punched. For example, since the anchor tubes may be located in different positions based on existing utilities, holes in the foundation plate may not be able to be determined beforehand. The foundation plate 320 with field drilled holes may be placed over the anchor tubes 305 with threaded rods 325 with tension bolt adapter 335 in the tubes 305. In some embodiments, the foundation plate 320 may rest on the tubes 305. Thus, when the tubes are cut to a same height, the foundation plate 320 is leveled by sitting on top of the tubes 305. The foundation plate 320 may be set on, or above, the anchor tubes 305, leveled and then bolted to the treaded rods 325 using the threaded rods 325. To connect the replacement light pole to the foundation plate 320, breakaway bolts may be installed in the foundation plate 320. The breakaway bolts may be secured in a set of holes that are optimized for a determined offset from a curb or regular bolts (e.g., grade 8 bolts) if outside a travel lane or a clear zone. The regular bolts may comprise grade 5 or harder bolts.

Figure 4:
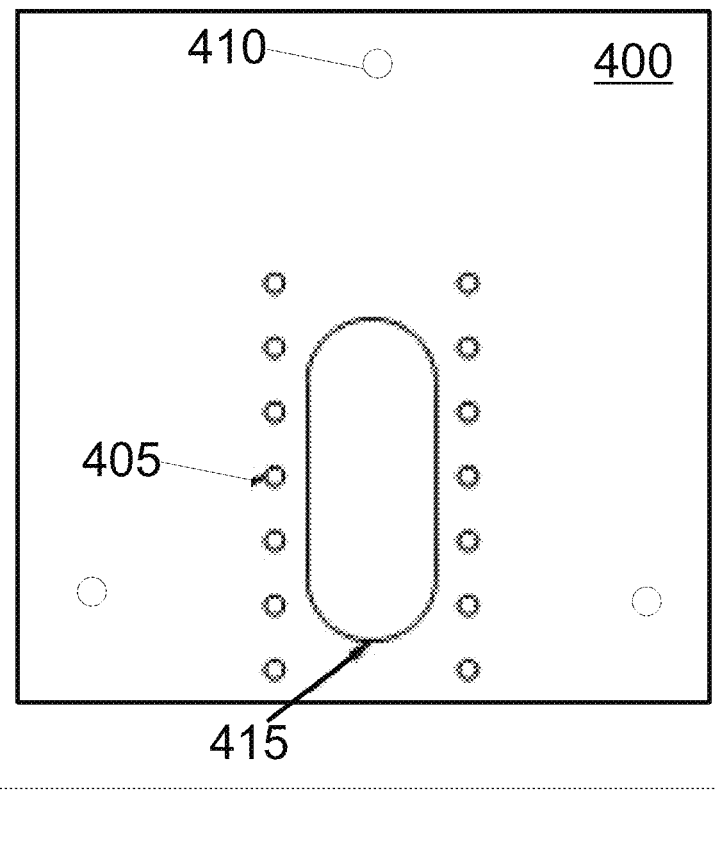
FIG. 4 illustrates a portion of a light pole replacement system in accordance with some embodiments.

For example, and now referring to FIG. 4, an embodiment of a foundation plate 400 is illustrated. The foundation plate 400 may include a first plurality of holes 410 to receive threaded rods such as threaded rods 325 as described in FIG. 3. The first plurality of holes 410 may be determined onsite and the location of the first plurality of holes 410 may be based on a determined location of existing utilities. Furthermore, the foundation plate 400 may include a second plurality of holes 410 that surround or are aligned with an opening 415. The opening 415 may receive electrical conduit containing power or communication services and the second plurality of holes 410 may receive breakaway bolts to secure a replacement light pole to the foundation plate 400.

In some embodiments, the light pole replacement system described herein may function as a retrofit system. In some embodiments, the light pole replacement system described herein may be used for installing cellular integrated light poles or simply cellular poles where light poles did not previously exist.

This written description uses examples to disclose multiple embodiments, including the preferred embodiments, and also to enable any person skilled in the art to practice the invention, including making and using any devices or systems and performing any incorporated methods. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

What is claimed:

1. A light pole replacement system comprising:
   a foundation plate to support a light pole;
   a plurality of anchor tubes;
   threaded rods; and
   tension bolt adapters each comprising a top portion to receive a respective one of the threaded rods, and a bottom portion that comprises an opening to receive one or more fasteners for securing each tension bolt adapter to a respective one of the plurality of anchor tubes, wherein the plurality of anchor tubes are placed into the ground based on a determined placement of the plurality of anchor tubes, holes are created in the foundation plate based on a location of the plurality of anchor tubes and the foundation plate is placed over the plurality of anchor tubes with the threaded rods and the tension bolt adapters in the plurality of anchor tubes to couple the foundation plate to the plurality of anchor tubes.

2. The system of claim 1, wherein the top portion of each tension bolt adapter is threaded to receive a respective one of the threaded rods.

3. The system of claim 1, wherein the bottom portion comprises a first half and a second half and the opening to receive the one or more fasteners is defined by a first curved section of the first half and a second curved section of the second half.

4. The system of claim 1, wherein the plurality of anchor tubes comprises helical anchors.

5. The system of claim 1, wherein a determined placement of the plurality of anchor tubes is based on avoiding contact with existing utilities and a position of the plurality of anchor tubes are transferred to the foundation plate.

6. The system of claim 3, wherein the first half and the second half are separated by a space.

7. The system of claim 1, wherein each of the tension bolt adapters is secured to a respective one of the plurality of anchor tubes via a bolt that extends through, and perpendicular to, the respective one of the plurality of anchor tubes.

8. The system of claim 7, wherein a top portion of each of the tension bolt adapters receives a respective one of the threaded rods that extend out from the respective one of the plurality of anchor tubes.

9. The system of claim 8, further comprising one or more breakaway bolts or grade 5 or harder bolts coupled to the foundation plate and the replacement light pole.

10. A light pole replacement system comprising:
    a foundation plate to support a cellular integrated light pole;
    a plurality of anchor tubes;
    threaded rods;
    tension bolt adapters each comprising a top portion to receive a respective one of the threaded rods, and a bottom portion that comprises an opening to receive one or more fasteners for securing each tension bolt adapter to a respective one of the plurality of anchor tubes;
    one or more breakaway bolts or grade 5 or harder bolts coupled to the foundation plate and the replacement light pole, wherein the plurality of anchor tubes is placed into the ground based on a determined placement of the plurality of anchor tubes, holes are created in the foundation plate based on a location of the plurality of anchor tubes and the foundation plate is placed over the plurality of anchor tubes with the threaded rods and the tension bolt adapters in the plurality of anchor tubes to couple the foundation plate to the plurality of anchor tubes.

11. The system of claim 10, wherein the top portion of each tension bolt adapter comprising the threaded pocket is threaded to receive a respective one of the threaded rods.

12. The system of claim 10, wherein the bottom portion comprises a first half and a second half and the opening to receive the one or more fasteners is defined by a first curved section of the first half and a second curved section of the second half.

13. The system of claim 12, wherein the first half and the second half are separated by a space.

14. The system of claim 10, wherein the plurality of anchor tubes comprises helical anchors.

15. The system of claim 10, wherein each of the tension bolt adapters is secured to a respective one of the plurality of anchor tubes via a bolt that extends through, and perpendicular to, the respective one of the plurality of anchor tubes.

16. The system of claim 15, wherein a top portion of each of the tension bolt adapters receives a respective one of the threaded rods that extend out from the respective one of the plurality of anchor tubes.

17. A light pole replacement system comprising:
a foundation plate to support a replacement cellular integrated light pole;
a plurality of anchor tubes;
threaded rods;
tension bolt adapters each comprising a top portion to receive a respective one of the threaded rods, and a bottom portion that comprises an opening to receive one or more fasteners for securing each tension bolt adapter to a respective one of the plurality of anchor tubes, wherein the tension bolt adapter are secured to a respective one of the plurality of anchor tubes via a bolt that extends through, and perpendicular to, the respective one of the plurality of anchor tubes;
one or more breakaway bolts or grade 5 or harder bolts coupled to the foundation plate and the replacement light pole, wherein the plurality of anchor tubes is placed into the ground based on a determined placement of the plurality of anchor tubes, holes are created in the foundation plate based on a location of the plurality of anchor tubes and the foundation plate is placed over the plurality of anchor tubes with the threaded rods and the tension bolt adapters in the plurality of anchor tubes to couple the foundation plate to the plurality of anchor tubes.

18. The system of claim 17, wherein a top portion of each of the tension bolt adapters receives a respective one of the threaded rods that extend out from the respective one of the plurality of anchor tubes.

19. The system of claim 17, wherein the top portion of each tension bolt adapter comprising the threaded pocket is threaded to receive a respective one of the threaded rods and wherein the bottom portion comprises a first half separated by a space from a second half and the opening to receive the one or more fasteners is defined by a first curved section of the first half and a second curved section of the second half.

20. The system of claim 17, wherein the plurality of anchor tubes is placed into the ground between 2 and 20 feet below a finished grade associated with an existing light pole and each of the plurality of anchor tubes are cut to a determined length based on the finished grade associated with the existing light pole.

* * * * *